3,634,327
PROCESS FOR PREPARING IMPROVED EPOXY RESIN ADHESIVES CONTAINING MINOR AMOUNT OF A URETHANE MODIFIER AND A BISPHENOL TYPE COUPLING AGENT
Jerry Marvin Hawkins, Lake Jackson, Tex., assignor to The Dow Chemical Company, Midland, Mich.
No Drawing. Filed Oct. 31, 1969, Ser. No. 873,084
Int. Cl. C08g 30/04
U.S. Cl. 260—47 EP                      3 Claims

ABSTRACT OF THE DISCLOSURE

This invention is directed to an improved process for preparing urethane modified solid epoxy resins comprising, reacting a liquid epoxy resin, which has been modified with a urethane product, with a bisphenol compound. These compositions are particularly useful in adhesive formulations.

---

It is desirable to provide epoxy resin formulations which are capable of rapid curing to form essentially non-tacky, flexible, thermoset materials having excellent adhesion to metals. Heretofore, efforts to achieve such results have included the utilization of flexibilizing curing agents such as the polyamides or polysulfides; or alternately, incorporating small percentages of elastomeric polymeric materials that are compatible but not necessarily reactive with the epoxy resin or hardener.

The flexibilizing curing agents must be employed in a relatively high ratio to the amount of epoxy resin. This alters the physical properties of the cured products so as to reduce such values as the tensile strength and particularly the shear strength. On the other hand, the elastomeric polymers are added in small quantities so that the flexibility of the cured product is enhanced without reducing the physical strength properties. The small quantity added, however, does not allow improvement beyond the increase in flexibility. For example, such properties as peel strength of epoxy adhesives for metals, or physical properties at reduced temperatures in the range of −100° F., are not improved.

More recently, epoxy resins have been modified by forming the modifier "in situ" in the resin by the addition to a solid epoxy resin of a prepolymer such as an adduct of a polyol with an isocyanate in combination with a relatively low molecular weight scavenger compound referred to as a "capping agent." However, such solid epoxy resins often contain seveal aliphatic hydroxyl groups which, at the temperatures which must be employed in order to maintain the solid resin in a molten state, tend to react with the isocyanate present in the prepolymers to form undesirable gels.

It has been discovered, which discovery forms the present invention, that if the prepolymer containing free (—NCO) groups and the scavenger compound is added to a liquid epoxy resin and reacted to eliminate all free (NCO) followed by the addition of certain bisphenol type coupling agents in amounts sufficient to form a solid epoxy resin composition, that the secondary hydroxyls formed will not be affected by the isocyanate as such isocyanate has previously been converted to urethane, thereby eliminating the formation of gels and permitting the production of thermosettable resin compositions which are particularly useful in adhesive formulations. More specifically, according to the present invention, rapid curing, essentially non-tacky, solid epoxy resin adhesive compositions having significantly enhanced adhesion to metals are prepared by an improved process which reduces the tendency of the solid epoxy resin to gel; said improved process being to prepare the solid epoxy resin by reacting (coupling) a liquid epoxy resin which has been previously modified with a urethane (polyol-isocyanate adduct) with a bisphenol type compound in the presence of suitable catalysts.

The polyether polyols which are employed in preparing the epoxy resin modifier (polyol-isocyanate adduct) as contemplated by the present invention, are those prepared by reacting a polyhydroxy compound having a functionality of from about 2 to about 6 such as ethylene glycol, propylene glycol, butylene glycol, glycerine, trimethylol propane, pentaerythritol, sorbitol or a compound having reactive hydrogens such as ethylene diamine and aminoethyl ethanol amine; with an alkylene oxide such as ethylene oxide, propylene oxide, butylene oxide and mixtures thereof. The molecular weight of the polyols may range from about 250 to about 5000 with 1285 to 3500 being the preferred range.

The isocyanates which are employed are those mono and polyfunctional organic isocyanates such as phenyl isocyanate, toluene diisocyanate, polyphenyl polymethyl isocyanate (PAPI), hexamethylene diisocyanate, P,P′-diphenyl methane diisocyanate, fluorinated monoisocyanate having the structure

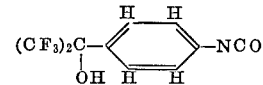

and the like. The invention contemplates the utilization of adducts of such polyether polyols and isocyanates having from 0 up to about 30 percent by weight of free —NCO groups. When free —NCO groups are present, a scavenger is reacted with such adduct in amounts sufficient to react with all of the free NCO groups. Exemplary of such scavengers are the liquid alkanols (methanol, ethanol, propanol, isopropanol, butanol, lauryl alcohol, furfuryl alcohol and the like); substituted alkanols such as benzyl alcohol and the like; polyoxyalkylene glycols (diethylene glycol, triethylene glycol, tetraethylene glycol, dipropylene glycol, tripropylene glycol, tetrapropylene glycol, dibutylene glycol, tributylene glycol, tetrabutylene glycol and the like); unsaturated alcohols such as allyl alcohol, methallyl alcohol, cinnamyl alcohol, 1-butene-4-ol, 1-pentene-5-ol, 1-hexene-6-ol, 2-butene-4-ol, 2-pentene-5-ol and the like; alkylene glycols (ethylene glycol, propylene glycol, butylene glycol); alkyl ethers of glycols (methyl ether of ethylene glycol, ethyl ether of ethylene glycol, n-butyl ether of ethylene glycol, phenyl ether of ethylene glycol, pentane diol, methyl ether of diethylene glycol, ethyl ether of diethylene glycol, n-butyl ether of diethylene glycol, methyl ether of propylene glycol, methyl ether of dipropylene glycol, methyl ether of tripropylene glycol); hydroxy alkyl glycidyl ethers; phenol; water; alkyl thiols (such as methane thiol, ethane thiol, propane thiol, butane thiol, etc.); alkyl dithiols (such as ethane dithiol, propane dithiol, butane dithiol); polythioalkyl dithiols $$[HS-R-(S-R)_n-SH$$

wherein R is ethyl, propyl, butyl, etc. and n is an integer from 1 to about 5]; hydroxy or thiol containing esters of mono and di saturated aliphatic, unsaturated aliphatic and aromatic carboxylic acids such as hydroxy ethyl acetate, hydroxy ethyl propionate, hydroxy ethyl butyrate, hydroxy ethyl acrylate, hydroxypropyl acrylate, hydroxy ethyl methacrylate, hydroxypropyl methacrylate, hydroxy ethyl benzoate, hydroxy propyl acetate, hydroxy propyl propionate, hydroxy propyl benzoate, etc. Any compound containing an active hydrogen atom capable of reacting with an —NCO group would be acceptable providing such compound does not also contain a group which will react with the epoxide groups contained in the epoxy resin under conditions encountered during shipment and storage.

A compound containing an —SH group is reactive, under certain conditions such as in the presence of a tertiary amine, with an epoxide group. However, under the conditions employed in the practice of the present invention, the scavengers containing an —SH group will preferentially react with the free —NCO groups in the polyol-isocyanate adduct, with no detectable reaction with the epoxide groups of the epoxy resin.

Commercial liquid epoxy resins of the type described under A (below) will contain a measurable concentration of hydroxyl groups. These are secondary aliphatic hydroxyls that are sluggishly reactive with isocyanate. Under the normal reaction conditions chosen, these hydroxyls remain entirely unreactive with the added isocyanate. However, in some cases enough of these hydroxyls are available to react with the added isocyanate without the utilization of an additional scavenger. In order for the reaction to occur, higher reaction temperatures (100–110° C.) and longer reaction times (about 2 hours) are required than for the cases where a scavenger is employed.

The modifiers described herein are useful as adhesion promoting agents for use with a wide variety of the common liquid epoxy resins and liquid epoxy resin mixtures including the glycidyl ethers of polyhydric phenols, bisphenols, glycols, glycerine, polyoxyalkylene glycols, and the like, said epoxy resins being represented by the following formulae:

A
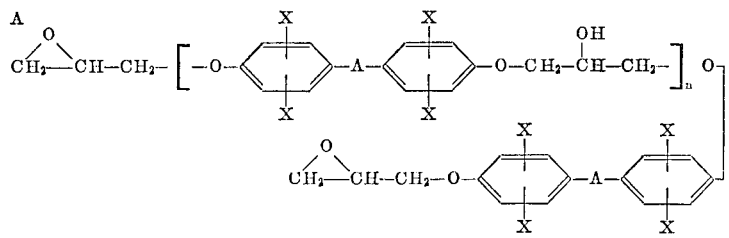

wherein A is selected from the group consisting of an alkylene group having from 1 to 4 carbon atoms,

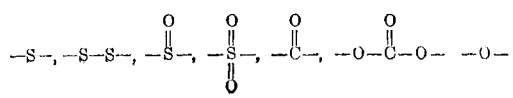

and the like, each X is independently hydrogen or a halogen having an atomic number from 17 to 35 inclusive and n is an integer having an average value of from about 0 to about 2.3;

B
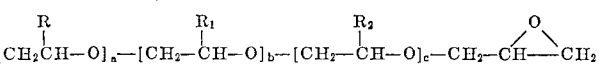

wherein R, R$_1$, and R$_2$ are independently hydrogen, an alkyl or haloalkyl group having from about 1 to about 4 carbon atoms, and a, b, and c are integers, the sum of which is an integer having an average value of from about 3 to 40;

C
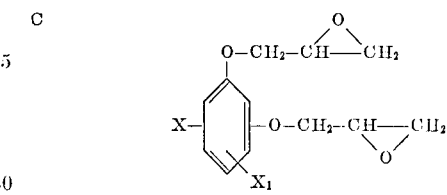

wherein X and X$_1$ are independently selected from the group consisting of hydrogen and a halogen having an atomic number from 17 to 35 inclusive.

D
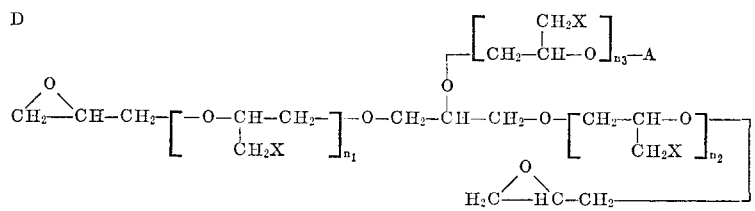

wherein $n_1$, $n_2$ are integers, the sum of which is an integer having an average value of from about 0 to about 4, X is a halogen having an atomic number from 17 to 35 inclusive and A is hydrogen or the group

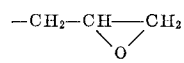

The epoxy resins represented by the Formulae A, B, C and D above may be referred to as epoxy resins of the polyglycidyl ether type.

The preparation of the epoxy resins represented by Formulae A, B and C are well known and need not be discussed further. Epoxy resins represented by "D" may be prepared by reacting glycerine with an epihalohydrin in the presence of a Lewis acid and subsequently epoxidizing with an alkali metal hydroxide or carbonate in the conventional manner.

Mixtures of various liquid epoxy resins including those described herein may also be employed in the practice of the present invention. Liquid resins having epoxy equivalent weights of from about 172 to 286 are particularly preferred.

Suitable bisphenol coupling agents which may be employed in the process of the present invention include those represented by the formula

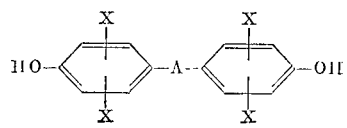

wherein A is selected from the group consisting of an alkylene group having from 1 to 4 carbon atoms,

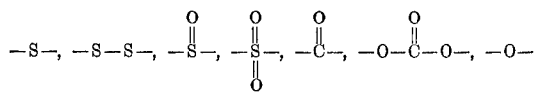

and each X is independently selected from hydrogen and a halogen having an atomic number from 15 to 35 inclusive.

The urethane modified solid epoxy resin compositions of this invention are preferably prepared in a first step by forming the modifier (the reaction product of a polyol-isocyanate adduct with a scavenger containing —OH— or —SH groups) in situ in the liquid epoxy resin although in some instances the modifier may be prepared and then blended with the epoxy resin. In the preferred method, the polyol-isocyanate adduct and the —OH or —SH containing compound are added to the liquid epoxy resin along with a suitable catalyst. The reaction is then generally conducted at a temperature of from about 80 to 90° C., at atmospheric or reduced pressures, for a time sufficient (about 30 minutes) to insure the complete disappearance of free —NCO groups (as determined by infrared analysis). Usually a period of about 30 minutes is required. Suitable catalysts are stannous octoate, dibutyl tin dilaurate, and the like. In some instances no catalyst is required if the reaction is conducted under elevated temperatures for extended periods of time, e.g. at about 100° C. for periods of about 2 hours.

Thereafter, the bisphenol coupling agent is stirred into the reaction media, usually with small amounts of a catalyst such as, e.g. benzyltriphenylphosphonium chloride, until completely dissolved. The mixture is then heated to a temperature of from about 95° C. to about 180° C., preferably at about 130° C. and allowed to react until the desired epoxide content is attained. Other suitable catalysts include the tertiary amines; alicyclic tertiary amines, unsaturated ring tertiary amines, aliphatic tertiary amines, hydrochloride salts, quaternary ammonium salts, quaternary phosphonium compounds and various inorganic and organic catalysts.

The bisphenol coupling agent need not be added to the urethane modified liquid epoxy resin immediately upon its preparation. The urethane modified epoxy resin can be prepared weeks and even months in advance to its subsequent reaction with the bisphenol coupling agent.

Further, the ratio of liquid epoxy resin to bisphenol coupling agent may be varied as desired to form a solid epoxy resin composition. A preferred ratio of such reactants is that which produces a 6.40 percent epoxide.

Alternatively, the polyol-isocyanate adduct of the present invention may be added to the liquid epoxy resin in the form of a latex with subsequent removal of water prior to formulation into an adhesive with the addition of the bisphenol coupling agent. The particular advantage is the simplicity of blending latex with epoxy. Such a latex generally does not contain any free —NCO groups; therefore, the use of a scavenger would not be required.

Further, the modified epoxy resin of this invention may be blended with most conventional fillers and curing agents. Suitable curing agents are dicyandiamide, N,N - dimethylaminoethylmethacrylamide, diethylaminopropylamine, aminoethyl piperazine, triethanol amine, aminated polyglycols such as aminated P-250 ( a polyoxypropylene glycol having an average molecular weight of about 250), Nadic® methyl anhydride, diallylmelamine, and polyamides such as Versamid® 140, 125, 110, and 115 among others and mixtures thereof. Suitable fillers are aluminum, silica, calcium carbonate, clay, organics, etc. (cellulose, wood flour, etc.).

Methods of preparing the urethane modified solid epoxy resin compositions by the present invention and illustration of desirable utility thereof, as adhesive coatings for metals, are presented in the following examples.

EXAMPLE I

The following general procedures were used to prepare the modified epoxy resins of the present invention and to evaluate their effectiveness as adhesives.

(A) Preparation of the adduct of polyether polyol and isocyanate

In each of a series of experiments, varying amounts of one of a series of polyether polyols were individually charged into a 500 ml. 3 neck reaction flask. Thereafter, the flask was purged with nitrogen, heated to a temperature of about 80° C. and varying amounts of one of a series of isocyanates added at a rate sufficient to maintain the reaction temperature between about 80° C. and 90° C. Following addition of the isocyanate, the mixture was allowed to digest at a temperature of about 80° C. with stirring for a period of about 3 hours.

(B) Modification of an epoxy resin

In each of a series of experiments, a liquid epoxy resin was placed in a reactor and agitated while maintaining the temperature of the reactor at about 85° C. To the reactor was then individually added a polyether polyol adduct prepared as in (A) above, along with varying amounts and types of hydroxy containing compounds (used to react with any free —NCO groups present in the adducts) and a small amount of stannous octoate as a catalyst. Each system was then placed under vacuum with stirring while under a temperature of about 85° C. until all of the isocyanate had been consumed as indicated by infrared analysis.

(C) Preparation of modified solid epoxy resin

In each of a series of experiments, a liquid epoxy resin modified as shown in (B) above was added to a reactor and agitated while maintaining a temperature of 130° C. To the reactor was then added individually a suitable catalyst in varying amounts for phenolic-epoxy reactions and agitated. To this was added in varying amounts a bisphenol compound (this material was added batchwise until the entire amount was added in order to control the exotherm). Each system was then placed under a nitrogen atmosphere and agitated while maintaining a temperature of about 130° C. until the desired epoxide equivalent weight was attained.

(D) Evaluation of the modified solid epoxy resin in an adhesive formulation

Individual adhesive formulations were prepared having the following general ratio of formulation ingredients:

Modified epoxy resin—100 parts
Hardener (dicyandiamide)—5–10 phr.
Cab-Q-Sil (silica filler)—2.5–5 phr.
Aluminum powder—70–80 phr.

Each formulation was tested as an adhesive for steel by the procedures as described by the ASTM test No. D–1781 (climbing drum peel test) and for aluminum by the ASTM test No. D–1002 (lap shear test).

The test specimens for this example and all other examples, unless otherwise noted, were cured 45 minutes at 360° F. and for the peel samples they were cured under platen pressure of 16.5 lbs. per square inch at 360° F. for 45 minutes.

The following Table I specifically identifies the preparation of a series of modified liquid epoxy resins.

TABLE I.—PREPARATION OF MODIFIED LIQUID EPOXY RESINS

| Run No. | Epoxy resin Kind [4] | Epoxy resin Grams | Glycol [5] | Isocyanate [6] | Isocyanate content, percent | Grams used | Isocyanate scavenger Type [7] | Grams used | Catalyst Type [8] | Grams used | Reaction conditions Temp. (°C.) | Reaction conditions Time (min.) |
|---|---|---|---|---|---|---|---|---|---|---|---|---|
| 1 | DER-331 | 342 | CP-2700 | TDI | 9.8 | 68.4 | TEG | 15.5 | T-9 | 0.2 | 85 | 30 |
| 2 | DER-331 | 100 | CP-2700 | TDI | 9.1 | 26.6 | BA | 6.2 | T-9 | 0.05 | 85 | 30 |
| 3 | DER-331 | 100 | CP-2700 | TDI | 9.1 | 26.6 | AA | 3.3 | T-9 | 0.05 | 85 | 30 |
| 4 | DER-331 | 117 | CP-2700 | HMDI [1] | 10.4 | 24.0 | TEG | 5.75 | T-12 | 0.05 | 85 | 30 |
| 5 | DER-331 | 50 | CP-2700 | TDI [3] | 9.8 | 9.5 | | | T-9 | 0.05 | 85 | 45 |
| 6 | DER-337 | 100 | CP-2700 | TDI [3] | 9.1 | 24.1 | AA | 2.98 | T-9 | 0.05 | 85 | 30 |
| 7 | DER-331 | 1,000 | CP-2700 | TDI [3] | 9.8 | 200.0 | TEG | 45.4 | T-9 | 0.5 | 85 | 30 |
| 8 | DER-331 | 112 | CP-2700 | TDI [3] | 9.8 | 26.0 | TEG | 6.1 | T-9 | .05 | 85 | 30 |
| 9 | DER-331 | 200 | CP-2700 | TDI [3] | 9.1 | 53.2 | AA | 6.68 | T-9 | .05 | 85 | 30 |
| 10 | DER-331 | 18,160 | CP-2700 | TDI [3] | 9.8 | 3,632 | TEG | 312.0 | T-9 | 3.7 | 85 | 30 |
| 11 | DER-331 | 116.9 | P-2000 | TDI [2] | 8.9 | 58.2 | CX-7027 | 33.1 | T-9 | 0.05 | 85 | 30 |
| 12 | DER-331 | 100 | CP-2700 | TDI [3] | 9.1 | 26.3 | AA | 3.34 | T-9 | 0.05 | 85 | 30 |

[1] (2323-27); CP-2700—150 g.; HMDI—48.4 g.
[2] (2512-39); 200 g. of P-2000; 73.2 g. of TDI.
[3] 100 g. of CP-2700; 37.5 g. of TDI.
[4] Epoxy resin:

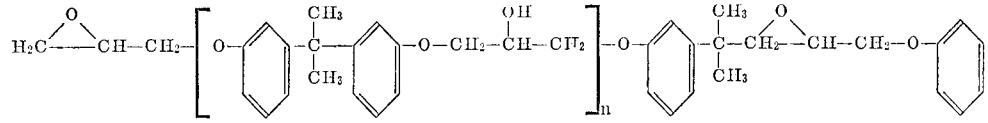

DER-331: Where n has an average value of about 0.134
DER-337: Where n has an average value of about 0.493.
[5] Glycol:
  CP-2700: Glycerine initiated polyoxypropylene glycol having an average molecular weight of about 2,700.
  P-2000: Polyoxypropylene glycol having an average molecular weight of about 2,000.
[6] Isocyanate:
  TDI: Toluene diisocyanate.
  HMDI: Hexamethylene diisocyanate.
[7] Isocyanate scavenger:
  TEG: Tetraethylene glycol
  BA: Benzyl alcohol
  AA: Allyl alcohol
  CX-7027: Polyglycidyl ether of glycerine having an OH equivalent weight of 242 and an epoxide equivalent weight of 142
[8] Catalyst:
  T-9: Stannous octoate
  T-12: Dibutyl tin dilaurate.

The following Table II illustrates the preparation and adhesive strength of a series of urethane modified solid epoxy resins.

TABLE II.—PREPARATION OF URETHANE MODIFIED SOLID EPOXY RESINS

| Modified epoxy Type (from Table I) | Modified epoxy Grams used | Bisphenol type compound Type | Bisphenol type compound Grams used | Catalyst Type | Catalyst Grams used | Reaction conditions Time, hr. | Reaction conditions Temp. (°C.) | Product analysis Epoxy eq. calculated | Product analysis Weight [1] titrated | Product analysis Modifier, phr. | Adhesive strength data DICY cure (°C.) S.P. | Adhesive strength data DICY cure Climbing drum peel, lbs./in. | Adhesive strength data DICY cure Lap shear, p.s.i. |
|---|---|---|---|---|---|---|---|---|---|---|---|---|---|
| 1 | 426.9 | Bis A | 108.7 | NMM | 1.75 | 1 | 115 | 521 | 671 | 15.5 | 85 | 135 | |
| 2 | 132.8 | Bis A | 32.4 | BTPPC | 0.33 | 6 | 100 | 525 | 577 | 20.0 | 64 | 70 | 5,400 |
| 3 | 129.9 | Bis A | 32.4 | BTPPC | 0.09 | 9.5 | 98 | 525 | 506 | 20.0 | 79 | 120 | 4,000 |
| 4 | 146.7 | Bis A | 32.6 | NMM | 0.15 | 3.0 | 100 | 411 | 465 | 16.0 | | [2] 79 | |
| 5 | 120 | Bis A | 32.9 | BTPPC | 0.37 | 5.2 | 130 | 525 | 538 | 15.0 | | | 5,200 |
| 6 | 127 | Bis A | 20.5 | BTPPC | 0.82 | 5.4 | 100 | 525 | 585 | 20 | 80 | 70 | 5,900 |
| 7 | 124.5 | Bis A | 46.5 | NMM | 0.11 | 3.0 | 130 | 1,190 | 860 | 13.7 | | 80 | |
| 8 | 144.1 | Bis A | 38 | NMM | 0.15 | 3.0 | 90 | 575 | 545 | 24 | | [3] 106 | |
| 9 | 259.8 | Bis A | 64.8 | BTPPC | 1.53 | 3.0 | 180 | 525 | 525 | 20 | 85 | 100 | 5,440 |
| 10 | 22,104.0 | Bis A | 5,902 | ETPPI | 45.0 | 3.5 | 130 | 550 | 547 | 15 | 73 | 111 | |
| 7 | 139.5 | Bis A | 38.0 | NaOH | 0.16 | 1 | 130 | 579 | 606 | 15 | | 60 | |
| 12 | 129.9 | Bis A | 32.4 | TPMPB | 0.35 | 6 | 104 | 525 | 525 | 20 | 80 | 54 | 5,360 |
| 7 | 100 | TBBPA | 60.6 | NMM | 0.12 | 2 | 130 | 686 | 785 | 11.5 | | 113 | 5,800 |
| DER-331 [3] | 115.4 | Bis A | 34.6 | NMM | 0.07 | 3 | 160 | 525 | 495 | 0 | | 41 | |

[1] Based on resin only (excludes wt. of modifier).
[2] Used Fiberglas reinforcement.
[3] No modifier.

NOTE: Bis A=Bisphenol A; TBBPA=Tetrabromobisphenol A; NMM=N-Methyl Morpholine; BTPPC=Benzyltriphenylphosphonium chloride; ETPPI=Ethyltriphenylphosphonium iodide; TPMPB=Triphenylmethylphosphonium bromide; DICY=Dicyandiamide.

What is claimed is:
1. In the process for the preparation of epoxy resin adhesives comprising admixing a liquid epoxy resin of the type consisting of polyglycidyl ethers of polyhydric phenols and alcohols type, with a modifier comprising the reaction product of (a) from about 5 to about 40 parts per hundred parts of said epoxy resin of an adduct of a polyether polyol and an organic isocyanate, said adduct having from 0 up to about 30 percent by weight of free —NCO groups and (b) a scavenger compound which is non-reactive with said epoxy resin and which contains at least one active group from the class consisting of —OH and —SH in sufficient quantity to react with said free —NCO groups; the improvement consisting of reacting the modified liquid epoxy resin at a temperature of from about 95° C. to 180° C. with a bisphenol type coupling agent represented by the formula

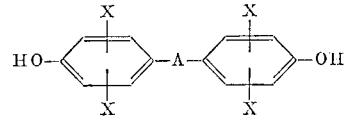

wherein A is selected from the group consisting of an alkylene group having from 1 to 4 carbon atoms,

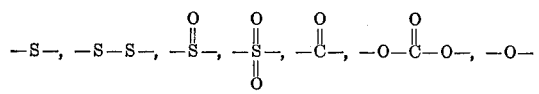

and each X is independently selected from the group consisting of hydrogen and halogen having an atomic number from 17 to 35 inclusive; said coupling agent being present in amounts sufficient to form a solid epoxy resin composition.

2. The process of claim 1 wherein said liquid epoxy resin is a diglycidyl ether of bisphenol A.

3. The process of claim 2 wherein said bisphenol coupling agent is bisphenol A.

References Cited

UNITED STATES PATENTS

| | | | |
|---|---|---|---|
| 3,239,580 | 3/1966 | Pendleton et al. | 260—830 |
| 3,379,684 | 4/1968 | Wiesner et al. | 260—47 |
| 3,424,719 | 1/1969 | Masters | 260—47 |
| 3,525,779 | 8/1970 | Hawkins | 260—47 X |

WILLIAM H. SHORT, Primary Examiner

T. E. PERTILLA, Assistant Examiner

U.S. Cl. X.R.

260—2 EP, 77.5 AP, 830 TW

Disclaimer 3,634,327.—*Jerry Marvin Hawkins*, Lake Jackson, Tex. PROCESS FOR PREPARING IMPROVED EPOXY RESIN ADHESIVE CONTAINING MINOR AMOUNT OF A URETHANE MODIFIER AND A BISPHENOL TYPE COUPLING AGENT. Patent dated Jan. 11, 1972. Disclaimer filed Apr. 22, 1971, by the assignee, *The Dow Chemical Company*.

Hereby disclaims all the portion of the term of the patent subsequent to Aug. 25, 1987.

[*Official Gazette April 25, 1972.*]